Sept. 28, 1943.  C. E. HEMMINGER  2,330,710
REGENERATION OF CATALYSTS
Filed March 11, 1939
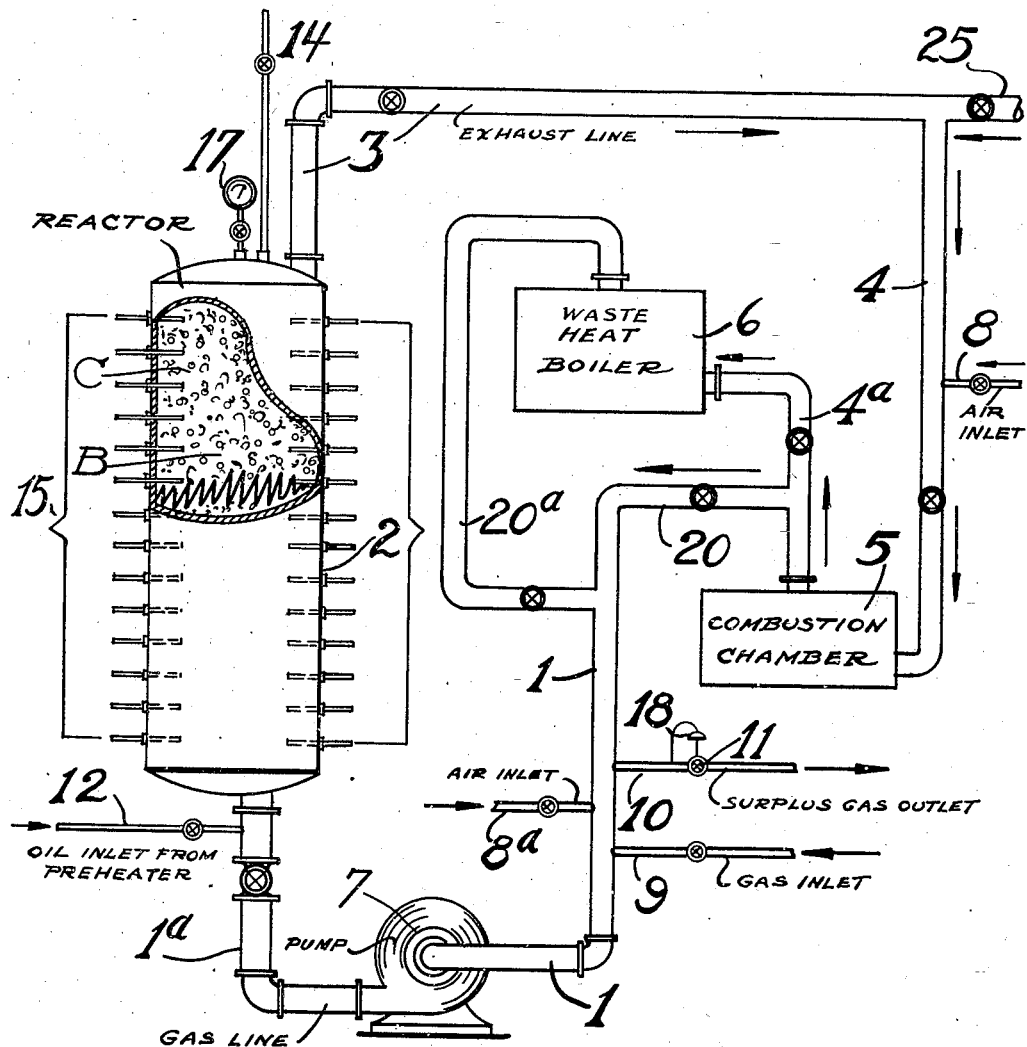
Charles E. Hemminger Inventor
By _____ Young Attorney Patented Sept. 28, 1943

2,330,710

UNITED STATES PATENT OFFICE 2,330,710

REGENERATION OF CATALYSTS

Charles E. Hemminger, Westfield, N. J., assignor to Standard Oil Development Company, a corporation of Delaware Application March 11, 1939, Serial No. 261,174

11 Claims. (Cl. 252—242)

The present invention relates to the novel features described hereinafter, reference being had to the accompanying drawing, which shows one form of apparatus in which the invention may be practiced with good results.

In its broadest aspect, the invention relates to improvements in catalytic reactions. More particularly, the invention relates to the regeneration of a solid or contact catalyst which has become contaminated or fouled during a catalytic reaction by a contaminant or poison which may be removed from the catalyst by oxidation and/or combustion.

In catalytic oil cracking employing a clay, zeolite, synthetic gel or some other solid catalytic catalyst, the cracking operation usually causes the deposition of a tarry carbonaceous deposit on the catalyst which impairs or destroys the efficiency of the catalyst so that the same must be periodically regenerated. The present invention proposes to regenerate such a catalyst by a combustion method and to remove the gaseous products of combustion from the reactor. These gases contain together with $CO_2$ and $H_2O$, appreciable quantities of CO, $H_2$, $CH_4$ and other combustible gases. These combustible gases result from incomplete combustion of the carbonaceous contaminants; also from the water gas reaction, from distillation of combustibles and the like.

In the prior art practice, a portion of the gases resulting from the combustion of the catalyst contaminants is recycled to dilute the air or other oxygen-containing gas to absorb the heat of combustion in the reactor, so that the maximum temperature of combustion is limited. The combustibles in the recycle gas will, of course, burn when they contact the catalyst in conjunction with the air or oxygen and will be consumed and of no benefit in the regeneration.

This invention proposes to burn the combustibles in the recycle gas in an external chamber preferably in the presence of an oxidation promoter, such as iron oxide, copper oxide, lead oxide, zinc oxide, chromium oxide and the like, and to use the gas issuing from this external chamber to dilute the free oxygen containing gas fed to the reactor during regeneration.

Referring to the drawing, the figure represents partially diagrammatically a vertical view of an apparatus selected to illustrate the invention.

In the drawing, the apparatus shown may be employed in the catalytic conversion of hydrocarbons. The usual preheating and fractionating apparatus is not shown since the invention resides more particularly in a method of preparing inert gas for dilution of oxygen or oxygen-containing gas during regeneration so that regeneration may be consummated more quickly without exceeding the maximum allowable temperature during the regeneration of spent catalyst, and hence, the drawing shows merely a suitable converter containing catalyst and such accessory apparatus as is necessary to carry out the novel features involved in the regeneration as hereinafter explained. That is to say, 1 and 1—a represent a valved oxygen-containing gas inlet line to a reactor 2 of the vertical shell type containing a continuous bed of catalyst C; 3 represents an exhaust line through which the products of the combustion of the catalyst contaminants or poisons are withdrawn; 4 represents a valved line leading to a combustion chamber 5 and line 4—a connects chamber 5 and waste heat boiler 6. Air inlet line 8 permits introduction of air into the gaseous products of combustion in line 4 or air may be introduced into the recycle gas through 8—a after the recycle gas has passed through the combustion chamber and/or the waste heat boiler. In certain instances, as where the recycle gases are at temperatures of the order of 650 to 750° F., the said gases from chamber 5 may be by-passed around waste heat boiler 6 through line 20, but ordinarily the recycled gas passes through 6 and into line 1 by way of line 20—a. Inert gas from some outside source, viz. hot or cold carbon dioxide and/or superheated steam and/or nitrogen or mixture of these, or some equivalent gas, may be admitted through line 9. Surplus gas may be withdrawn from the system through line 10, and valve 11 in this line is controlled by a pressure regulator 18 enabling the fixing of the gas back pressure in the system to some definite value. Pump 7 causes circulation of gas during regeneration. In on-stream operation, preheated oil is led into the reactor through line 12 and the reaction products are withdrawn through line 14.

In order to describe the present method of regeneration, it will be assumed that the catalyst C has become spent due to the accumulation of 1% to 5% by weight, of a carbonaceous contaminant formed during an oil cracking operation. The temperature of the catalyst during cracking is ordinarily maintained at about 800 to 900° F., with a temperature of about 870° F. preferred, and at the end of the cracking phase is within this temperature range. The cracking operation is discontinued and then a thorough purging of the catalyst with superheated steam, nitrogen, carbon dioxide or mixtures thereof, or some similar gas substantially free of elemental or free or loosely combined oxygen is effected. The purging gas may be admitted to the reactor through line 12 and withdrawn through 14. Or if 12 is the oil vapor inlet during cracking, the purging gas may be admitted through 14 and discharged through 12. The main purpose of the use of the purging gas, which should preferably be at a temperature of about 820° F. or thereabouts, is to drive off the residue of oil vapors remaining after the cracking operation. After thorough purging, an oxygen-containing gas at a temperature of from about 600° F. to 800° F. is forced into reactor 2 from lines 1 and 1—a by pump 7. The oxygen-containing gas admitted through line 1—a contains from about 1% to about 10% oxygen as it enters reactor 2. Samples of gas may be taken from line 1—a for analysis and based on this determination, the percent of oxygen entering the reactor can be controlled. The contact of the oxygen-containing gas with the catalyst under the conditions hereinafter specified in more detail causes an oxidation or a distillation of the catalyst contaminants and the gaseous products are withdrawn through 3.

The gases issuing from the reactor 2 are at a temperature of about 950° F. to 1050° F. normally. These gases may contain as much as 2% free hydrogen together with similar quantities of CO, hydrogen-carbon compounds and other combustible material. In other words, the heated oxygen-containing gas which contacts the heated catalyst C and is forced therethrough does not ordinarily convert all of the combustible contaminants or catalyst poisons to non-combustible material but rather, as stated, the effluent gases passing out of the reactor through line 3 contain appreciable quantities of combustible material. These gases are passed into line 4 and air or some gas containing free oxygen is admitted through line 8 to line 4. The amount of air here admitted is the total required for burning of combustibles in line 4 in the combustion chamber 5 and for subsequent regeneration in reactor 2. The combustibles and the air or the like are then led to chamber 5, and burned. The combustion causes an increase of the temperature to about 1200° F. or higher and sensible heat may be recovered from this latter combustion process by heat transfer in waste heat boiler 6 until the temperature of the gases is reduced to from about 700° F. to 800° F. or thereabouts. The combustion products of 5 are therefore passed through waste heat boiler 6 to recover this heat and to cool the gases. From waste heat boiler 6 the gases pass through line 20—a to line 1. A portion of the cooled gas thus produced may be withdrawn through line 10 and the remainder recirculated.

At the beginning of the regeneration phase, it may be necessary in order to start the regeneration process, i. e., to cause ignition of the combustible contaminants on catalyst C, to introduce a hot inert gas, say at a temperature of 650 to 800° F. through lines 25, 4, 20, 1 and 1—a into reactor 2, a small amount of air being added to the inert gas through inlet 8 or 8—a. If desired, a further quantity of some inert diluent gas either hot or cold, such as nitrogen, steam, carbon dioxide or the like, or mixtures of such gases, may be admitted through line 9.

The entering regeneration gas is preferably under a gauge pressure of 5 to 125 lbs. per square inch with about 45 lbs. per square inch preferred. The pressure within the reactor is indicated by some suitable gauge 17 or the like and may be regulated by means of mechanism 18 operating valve 11 in line 10.

The combustion will commence in the modification shown at some level or zone near the bottom of the reactor 2 and will proceed upwardly as the regeneration proceeds. The progress of the regeneration can be followed by observation of the temperatures prevailing at various levels as indicated by the thermocouples 15 or the like. In an elongated bed of catalyst, due to the flow of hot products of combustion in advance of the actual combustion, there may be regions or zones which are preheated to some temperature, in advance of the actual combustion zone, such that when the combustion actually reaches the said preheated zone the temperature prevailing during actual combustion may exceed the danger point. That is to say, in most instances the combustion temperature should not exceed about 1120° F. but when the unregenerated catalyst, let us say, in the neighborhood of B in the drawing has been preheated by combustion products from lower zones or regions to temperature of 900° F. to 1000° F. or thereabouts, the oxygen concentration in the incoming gas should be lowered considerably at once, say to 0.5% concentration or thereabouts and/or the temperature of the recycled gas should be lowered to about 500° F. or lower by introducing cold inert gas through line 9.

The recycled gas, or the gas which flows out through exhaust line 3 in normal operation, in say a 100 barrel a day unit may have an analysis about as follows:

|  | Per cent |
|---|---|
| $CO_2$ | 8.4 |
| $CO$ | 2.6 |
| $H_2$ | 0.2 |
| $O_2$ | 8.8 |
| $N_2$ | 80.0 |

If the carbon monoxide and hydrogen in 100 cu. ft. of the above gas were burned, 900 B. t. u.'s of heat would be released per 200 cu. ft. under standard conditions, of the outlet gas to be recycled. As nearly 80% of this available heat was evolved in the combustion chamber 5, the temperature of the effluent gas would be increased about 340° F. With an inlet gas temperature of 750° F. and an outlet gas temperature of 950° F., both with respect to the reactor, the inlet gas temperature to the waste heat boiler would be about 1290° F. rather than 950° F. according to the known processes. It is, therefore, obvious that the carbon can be removed from the reactor faster and with less recirculation of gases with an overall temperature difference of 540° F. This greater temperature difference is due to the removal of some of the carbon as CO rather than $CO_2$ because of the reaction of $CO_2$ with carbon on the catalyst.

It is believed obvious that the present invention is adapted to regeneration not only of oil cracking catalysts but of any solid catalyst contaminated with combustible material and that the catalyst may be regenerated in situ or outside the reactor. In the former case by appropriate pipe connections and manifolding, it is possible to regenerate a catalyst not only in a reactor of the type shown, but also when the catalyst is contained in tubes, supported on trays or when the catalyst is in lump, granular or powdered form.

The invention is not limited to the precise details hereinbefore mentioned, but includes all modifications falling within the scope of the appended claims.

I claim:
1. In the regeneration of an adsorbent catalyst by the combustion of contaminating material deposited thereon during a catalytic reaction, the improvement which comprises substantially completely removing combustible material from the effluent regeneration gases by burning said gases in a combustion chamber separate from the reaction chamber, cooling said gases and returning at least a portion thereof together with free oxygen to the reaction chamber.

2. The process as set forth in claim 1, in which a heavy metal oxide is employed in the combustion chamber to promote oxidation of the combustibles.

3. In the process of regenerating a spent catalyst, contained in a reaction zone by combustion of a contaminating deposit, the improvement which comprises forcing a gas containing from 1% to 10% free oxygen through the catalyst in the reaction zone at combustion temperatures, withdrawing the products of the combustion from the reaction zone and conducting them to a combustion chamber and therein substantially completely removing the combustibles contained in said withdrawn gases by burning in the presence of an oxidation promoter, withdrawing the gases from the combustion chamber, reducing the temperature of the withdrawn gases by passing the gases through a waste heat boiler wherein the temperature of the gases is lowered several hundred degrees F., withdrawing the gases from the waste heat boiler and adding to them sufficient oxygen to produce a mixture containing from about 1% to about 10% free oxygen and returning said gaseous mixture to the reaction chamber.

4. The process of regenerating a solid catalyst contaminated with a tarry deposit which comprises forcing a heated oxygen containing gas through said catalyst causing combustion of catalyst contaminants, withdrawing the products of combustion containing combustibles from the catalyst, adding an oxygen containing gas thereto, substantially burning the combustibles and returning the last-named gas to the catalyst undergoing regeneration.

5. In the process of regenerating a catalyst containing contaminants by combustion of said contaminants, the improvement comprising removing the gaseous products of combustion from the catalyst which products contain combustibles, adding more oxygen containing gas than is necessary to burn the combustibles, burning said combustibles, removing a portion of the sensible heat from the gases and returning the cooled gases to the catalyst undergoing regeneration.

6. In the process of regenerating a catalyst containing contaminants by combustion of said contaminants, the improvement comprising removing from the catalyst zone, the gaseous products resulting from a combustion of the catalyst contaminants which gaseous products contain combustibles, adding an oxygen containing gas containing more oxygen than necessary to cause combustion of the said combustibles, causing combustion of the combustibles in the presence of a heavy metal oxide promoter, removing a portion of the heat from the gases and returning the cooled gases to the catalyst undergoing regeneration.

7. The process of regenerating a contaminated catalyst which comprises maintaining a catalyst zone and a combustion zone separated therefrom, forcing an oxygen containing gas through the catalyst under conditions causing combustion of the contaminants, removing the gaseous products of combustion containing combustibles from the catalyst zone, passing the last-named gases together with added oxygen containing gas to said combustion zone, and causing substantially complete combustion of the combustibles in said last-named gases and returning the products of the last-named combustion containing substantially no combustible material to the catalyst undergoing regeneration.

8. The process as set forth in claim 7 in which the amount of oxygen added to the gases issuing from the catalyst zone is in excess of that required to cause combustion of all of the combustibles in said gases.

9. The process of regenerating a contaminated catalyst which comprises forcing an oxygen containing gas at a temperature of from about 750° F. through said catalyst which is at a temperature of between about 800° to 900° F., withdrawing the resulting gases, said gases having a temperature of about 950° F., adding excess oxygen containing gas and burning the combustibles in the said gases causing a temperature rise to about 1290° F., recovering heat from the gases resulting from the said burning in an amount such that the temperature thereof is reduced to about 750° F. and returning the gases at this temperature to the reactor for continuation of the regeneration.

10. The process of regenerating a solid catalyst contaminated with a tarry deposit which comprises forcing a heated oxygen containing gas through said catalyst causing combustion of catalyst contaminants, withdrawing the products of combustion containing combustibles from the catalyst, adding an oxygen containing gas thereto, substantially burning the combustibles and returning the last-named gas to the catalyst undergoing regeneration.

11. The process of regenerating a solid catalyst contaminated with carbonaceous deposits which comprises forcing a heated oxygen-containing gas through said catalyst in a regeneration zone at temperatures sufficiently high to cause combustion of the catalyst contaminants, withdrawing the gaseous products of combustion containing combustibles from the regeneration zone, adding an oxygen-containing gas to said gaseous products of combustion withdrawn from the regeneration zone, substantially completely burning the combustibles contained in the said gaseous products of combustion in a combustion zone, rejecting a portion of the said gaseous products of the last-named combustion from the system, and then returning the remainder of the gaseous products of combustion from the combustion zone to the catalyst in the regeneration zone, together with oxygen-containing gas.

CHARLES E. HEMMINGER.